Jan. 31, 1967    C. D. BERGER    3,302,043
SYNCHRONOUS ELECTRIC MOTOR
Filed July 16, 1963
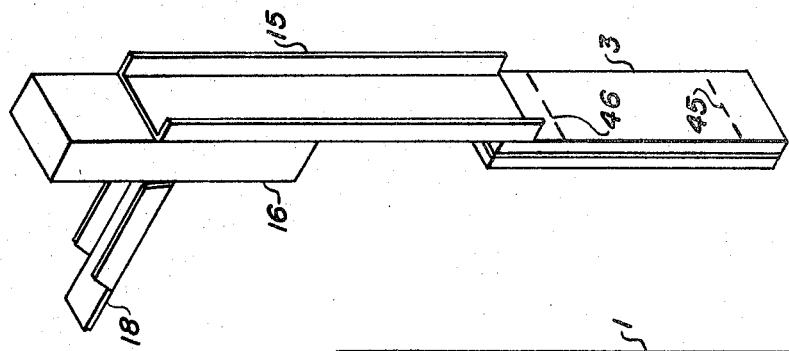
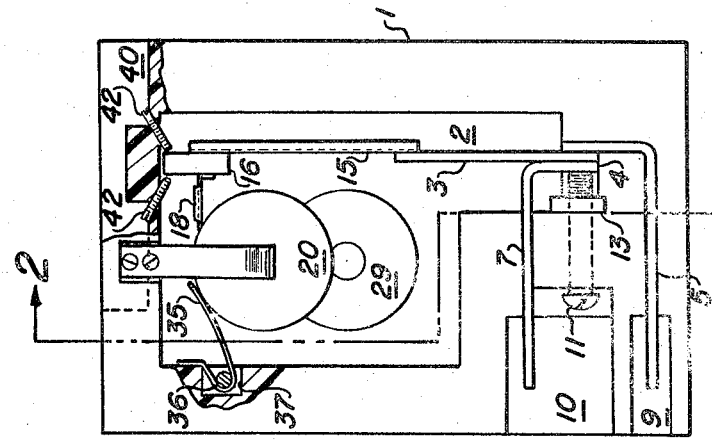

United States Patent Office 3,302,043
Patented Jan. 31, 1967

3,302,043
SYNCHRONOUS ELECTRIC MOTOR
Christian D. Berger, North Canton, Ohio, assignor to The Hoover Company, North Canton, Ohio, a corporation of Ohio
Filed July 16, 1963, Ser. No. 295,463
8 Claims. (Cl. 310—8.3)

This application discloses certain features in common with my application No. 295,464 filed July 16, 1963, and entitled "Electro-Thermal Motor," U.S. patent No. 3,192,417 issued June 29, 1965, to Werner G. Seck and Roland J. Knouff and entitled, "Synchronous Electric Motor," and U.S. patent No. 3,192,419 issued June 29, 1965, to Justice H. Beach and entitled "Synchronous Motor and Mounting."

My present invention relates particularly to improvements in piezoelectric or thermal wire type synchronous electric motors as disclosed in the aforesaid applications. In particular my present invention relates to a device for making more efficient use of expensive piezoelectric material, for isolating the noise caused by a high speed oscillating pawl and ratchet from being transmitted by a direct, rigid path to other parts of the motor, and to a device for determining the absolute value of the excursion of the pawl and to limit the pawl excursion independently of line voltage variations and other variables.

Accordingly, it is a specific object of my invention to utilize the piezoelectric drive material in a piezoelectric type motor in a most efficient manner so that every element of the stressed body of piezoelectric material is significantly stressed an contributes materially to meeting the work load imposed on the motor. As a result of my present arrangement I have found that I can reduce the amount of piezoelectric material required for a given clock motor by a factor of approximately one-half as compared with the arrangement disclosed in the aforesaid application of Werner G. Seck and Roland J. Knouff.

It is another particular object of my invention to provide means on a clock motor of the type above described such that the noise created by the pawl snapping over the teeth on the ratchet wheel during the non-driving stroke of the pawl and the impact noise of the pawl striking a radial flank of a tooth on the ratchet wheel during its driving stroke are damped at the pawl mounting itself to reduce audible noise.

It is a further particular object of my invention to provide a simple factory adjustment by which the total excursion of a particular pawl, ratchet and piezoelectric assembly and the limits of the pawl excursion are determined and fixed during the course of the manufacture rendering the device immune to normal variations in line voltage such as are met in household service.

Other objects and advantages of the invention will become apparent when taken in connection with the accompanying drawing wherein:

FIG. 1 is an elevational view of a piezoelectric type synchronous motor embodying my invention, FIG. 2 is a cross-sectional view of the device of FIG. 1 taken along the line 2—2 thereof and looking in the direction of the arrows, and FIG. 3 is an enlarged scale perspective view of a piezoelectric drive device, extender, pawl and sound deadening material associated therewith.

The piezoelectric drive motor ilustrated in the accompanying drawing is not to scale but is shown enlarged and comprises a frame or casing or support 1 preferably molded from plastic material having a central recess or depression 2 in one face thereof within which the actual motor mechanism is mounted.

The driving element of my motor comprises a narrow thin strip 3 constituting a piezoelectric device, the construction of which is preferably of the two layer sandwich type having a central thin brass strip upon opposite faces of which two thin layers of a piezoelectric material are adhered, but it is contemplated that single or multilayered piezoelectric devices may be used if desired. Preferably this material will be of the barium titanate or lead zirconate titanate types which are non-hygroscopic. The outer faces of the piezoelectric material are silvered to form electrical contact surfaces. The lower end of the member 3 projects into a narrow extension 4 of the recess 2 in housing 1 where it is held between the end portions of electrical connectors 5 and 7. The connector 5 lies in a slot 8 formed in housing 1 so that the bent end thereof, seen at the right-hand side of FIG. 1, abuts the right-hand face of the bottom portion of member 3. The connector bar 7 has its right-hand end bent, as viewed in FIG. 1, to abut the left-hand face of the element 3. The member 7 extends through a suitable slot in the housing 1 similar to slot 8. The free ends of members 5 and 7 project into recesses 9 and 10 respectively, formed in the housing 1 as shown most clearly in FIG. 1. The electrical connections to the device are suitably made to the projecting portion of members 5 and 7 which lie in recess 9 and 10.

Recess 10 is much larger than recess 9 in order to accommodate and to permit access to a mounting bolt 11 which extends through the housing 1 and is threaded into a captive nut 13 seated in a complemental portion of recess 4 in housing 1. The bolt 11 projects beyond nut 13 and engages the left-hand face, as viewed in FIG. 1, of the connector bar 7. As the bolt 11 is screwed through the nut 13 it jams the connector bars 5 and 7 and the portion of element 3 therebetween tightly together and against the right-hand wall of recess 4 in FIG. 1 thereby securely mounting these parts in the casing 1 and providing good electrical connection between the bars 5 and 7 and the opposite silvered faces of the piezoelectric element 3.

A thin section light weight sheet metal channel section member 15 which is rigid and is preferably made of stainless steel or material having similar corrosion resisting and strength properties is cemented, or otherwise suitably secured, to the upper free end of element 3. The free end of member 15 has suitably cemented to the left-hand face thereof, as viewed in FIG. 1, a small block of soft rubber or material having similar properties of resilience and sound deadening capabilities (hereinafter referred to as rubber-like material). The block 16 projects upwardly beyond the upper end of the channel member 15 for a purpose to be referred to hereinafter. A small very light weight pawl member 18 is cemented to the left-hand face of the block 16, as viewed in FIG. 1, and projects to the left thereof to bear upon a ratchet wheel 20 to be described more fully hereinafter. The pawl 18 is preferably constructed of very thin section light weight, springy material such as stainless steel and has its center part of channel section as shown most clearly in FIG. 3. The portion of pawl 18 between the central channel section and the down turned end actually cemented to the block 16 forms a spring section to urge the pawl downwardly against the peripheral surface of the teeth on ratchet wheel 20. The projecting end of member 18 is in the form of a light projecting tongue as most clearly shown in FIG. 3 and is the portion of the pawl which actually contacts the teeth on the ratchet wheel 20.

The ratchet wheel 20, its mounting and the parts associated therewith as illustrated herein are those more fully described in the above identified application of Werner G. Seck and Roland J. Knouff and in my application above identified. Briefly the ratchet wheel 20 is a light weight plastic molding having a mass preferably less than one gram and a diameter of a half inch and is provided with 250 peripheral ratchet teeth having a radial depth of about 0.003 inch and a pitch or tooth span of about 0.006+ inch. In consequence of these dimensions the pawl must have an excursion between about 0.007 inch and 0.012 inch to be sure that each reciprocation of the pawl will advance the ratchet by an amount equal to one tooth span only.

The ratchet wheel 20 and an associated small gear 22 are each press fitted upon a small spindle 23 which is journaled in a bushing 24 press fitted into the casing 1. The right-hand projecting end of spindle 23, as viewed in FIG. 2, bears against the lower free end of a light weight spring 26 secured to the casing 1 by screws 27. The function of the spring 26 is simply to apply a very light pressure to the axial end of the spindle 23 to maintain the small spur gear 22 in engagement with the right-hand end of bushing 24, as viewed in FIG. 2, to maintain proper axial position of ratchet 20 and its associated mechanisms.

The small spur gear 22 meshes with a larger diameter spur gear 29 press fitted on the end of a shaft 30 which is journaled in a bushing 31 press fitted in the casing 1. The shaft 30 is the output shaft of the motor and on its free end projecting beyond casing 1 it carries a small spur gear 32 which may be coupled to any suitable low level load requiring synchronous motor operation. For example, the gear 32 may mesh with a standard clock reduction gear to drive the hands of an electric clock.

The ratchet wheel 20 is subjected to a drag by means of a small light weight flat leaf spring 35 which is supported by being wrapped around a pin 36 extending through a recess 37 formed in casing 1. The function of the spring 35 is to apply a sufficient drag to the peripheral surface of ratchet wheel 20 to bring the same to a stop almost immediately from the termination of each driving stroke of the pawl 18 and also to prevent reverse rotation thereof as the pawl 18 retracts following each driving stroke thereof. The structure and functions of this drag spring are more fully set forth in my copending application identified above.

As shown in FIG. 1 the top portion of casing 1 is provided with a slot-like recess 40 opening to the outside thereof and extending well beyond each side of the block 16. Fine adjusting screws 42 are threaded through the wall of the casing 1 at the bottom of slot 40 and extend into the recess 2 with their projecting ends extending toward and in the path of motion of the block 16 on the projecting end portion of member 15. It is apparent from FIG. 1 that proper adjustment of the two screws 42 will determine the excursion allowed the pawl 18 when the piezoelectric element 3 is energized and will also set the limits of that excursion which will be determined as the block 16 strikes the projecting ends of the screws 42 as the block vibrates during energization of drive member 3.

When an alternating current supply source is connected across the terminals 5 and 7 the piezoelectric element 3 is subjected to the effects of full line voltage which for purposes of explanation herein will be assumed to be alternating current having a nominal value of 120 volts and a frequency of 60 cycles per second. Though my device is of course not limited to energization at that frequency or voltage, it is intended normally to be energized from whatever household alternating current service is available in the area in which it is to be utilized.

When a piezoelectric element such as the member 3 is subjected to electrical stress each transverse element thereof bends by an amount proportional to the voltage stress across its opposite faces. It is readily apparent from FIG. 3 that the element of the driver 3 represented by the plane of the dash line 45 will produce a considerable movement of pawl 18 because of its relatively great distance therefrom and will be stressed mechanically to a significant degree for the same reason. In contrast an element of the piezoelectric driver such as that represented by the plane of the line 46 will produce relatively less motion of pawl 18 for a given electrical stress than the element 45 and will also be subject to a lesser degree of mechanical stress. The greater the distance between any particular transverse plane of the piezoelectric device and its point of attachment to the pawl the greater will be the pawl movement induced by a specific increment of bending at the particular plane in the piezoelectric device and the greater will be the mechanical stress in the piezoelectric material at this point due to the load on the pawl. Thus, it is obvious that those portions of the piezoelectric device which are remote from the pawl, i.e. those close to the point at which the piezoelectric device is clamped between the conductors 5 and 7, are primarily responsible for the work performed by the piezoelectric device and are also those which are subjected to the stress which results from the load on the pawl. Contrariwise, in a situation where the piezoelectric device is of long length and has the pawl directly carried adjacent its end portion, bending motion of increments of piezoelectric device length adjacent the pawl have little effect in producing motion or doing useful work.

Piezoelectric material is a relatively expensive item. Any significant reduction in the amount of such material required for a specific purpose results in an economically important saving, thus in the piezoelectric motor described in detail in the above identified application of Werner G. Seck and Roland J. Knouff; the piezoelectric strip is approximately one and a quarter inches long, one-eighth inch wide and twenty-one thousandth inch thick. I have found that I can obtain essentially the same performance and effective pawl motion with the herein disclosed construction utilizing the same type of piezoelectric material with a driver seven-eighth inch long and having the same width and thickness as above specified and in which about one-eighth inch of the length is cemented to the extender 15. In each case approximately one-eighth inch at the lower end of the piezoelectric element is clamped between the conductor bars 5 and 7 and does not itself participate in the bending action nor does it in any direct way contribute to the motion of the pawl which drives the ratchet wheel. The cost saving by utilizing the rigid extender member 15, resulting in a large percentage reduction in the amount of piezoelectric material required, is a material economy in small, low cost motors of the type here under consideration.

The degree of excursion of any particular piece of piezoelectric material is a direct function of the line voltage to which it is subjected. If the line voltage varies, as it frequently does in household service, the excursion of the piezoelectric material and, hence, of the pawl is materially altered. Piezoelectric motors of the type herein disclosed can tolerate a considerable amount of excursion variation without losing synchronism or affecting the effective functioning of the device since any pawl excursion which is greater than the span of one tooth and less than the span of two teeth on the ratchet wheel (a difference of approximately 0.005 inch) will result only in an advance of one tooth per stroke of the pawl. Line voltage variations greater than the amount which can safely be tolerated do occur and if not compensated may cause the device to operate out of synchronism. The magnitude of the load on the motor can also change the pawl excursion.

As shown in FIG. 1 the mechanism is in its unenergized condition in which the piezoelectric device and the extender 15, block 16 and pawl 18 are in a neutral plane. The device will be designed to give the minimum acceptable pawl excursion for the minimum expected line voltage to be met in practice under maximum design load. Factory adjustment is accomplished without load and with the adjusting screws retracted. The motor is next energized and the voltage is increased until the pawl indexes two teeth per stroke. The screws are then advanced and adjusted until the pawl indexes one tooth per stroke. After this adjustment is made a drop of cement may be placed upon the adjusting screws to insure that they maintain their adjusted position.

After adjustment as above described, the application of a voltage greater than the voltage level at which the screws were set will tend to cause the pawl to have an excursion greater than that necessary to advance the pawl one tooth per cycle of applied alternating current; however, under these conditions, the block 16 will contact the stop screws 42 at each end of its excursion and limit the maximum travel of the pawl regardless of the line voltage applied to the piezoelectric device 3. This forcible stopping of the pawl does impose some mechanical stress on the piezoelectric drive element 3 and its associated parts, but these stresses are of low order and well within the tolerances which they can withstand. The total pawl excursion is not precisely that for which it was adjusted at the factory due to load and voltage variations which cause the block 16 to strike the pins 42 with varying force. Also the block 16 undergoes some flexure as it is resilient sound deadening type material; however, the maximum reasonably to be expected variation under these conditions is not sufficient to allow the pawl 18 to travel or have an excursion sufficient to pick up more than one tooth per stroke. The soft nature of the member 16 also deadens noise caused by its impacts with the ends of screws 42.

In certain of the aforesaid applications it has been explained that the piezoelectric driver, pawl, ratchet and drag spring individually and as a mechanical system should have resonant frequencies about 40 percent in excess of the frequency of the line current by which the device is to be energized. Under these conditions all parts operate reliably in synchronism with the line frequency and do not attempt to oscillate, vibrate or resonate at their natural frequency. These considerations apply with equal force to the herein disclosed system including the block 16.

It will be appreciated that the block 16 of rubber-like material absorbs and deadens some of the noise produced by the interaction of the ratchet and pawl with each other and does not produce objectionable noise as it strikes the limit stops.

The fixed factory adjustment structure herein provided allows a final adjustment of the complete assembled machanism. Thus, tolerances and minor inaccuracies in the assembled structure are compensated for by this final factory adjustment. Individual piezoelectric devices will vary one from another and all will not be perfectly true. These deviations from normal are readily accepted and accommodated by the herein disclosed construction since it is not rigidly required that the pawl engage the peripheral teeth on the wheel 20 at a particular angle to the vertical. The position at which the pawl engages the wheel 20 may vary within a small range without having any effect on the operation of the device and this range is sufficient to accommodate the inaccuracies and tolerances induced variations above referred to.

The adjustment is made to accommodate the particular parts and their assemblage in a particular motor. Where possible it is most desirable to make the final adjustment of the screws 42 after the motor is connected to and while it is driving its normal load. This arrangement allows these screws to be adjusted for individual variations in load though normally these will not be of major significance.

It will be appreciated that the pawl 18 reciprocates at the rate of 60 cycles per second under the conditions assumed herein. Even though the pawl is moving only a few thousandths of an inch its rate of movement is high. During each complete cycle of its operation it strikes a radial flank of a pawl tooth and builds up pressures until it begins to move the ratchet 20. At the end of each driving stroke, the pawl moves in the opposite direction and snaps down off the segmental flank of the tooth just advanced parallel to the radial flank of the next tooth and strikes the flat or segmental flank thereof after which it may move a slight distance along such segmental flank. In addition to the foregoing, the pawl may frequently bounce to a slight degree after snapping off a previously advanced tooth. All these factors have been found to produce noise having objectionable characteristics even though its amplitude is not high. The noise thus produced is particularly objectionable if it is allowed to travel through parts of the system which are good sound conductors until it reaches some surface which can in effect act as a radiator. I have found that a small block of rubber or similar sound deadening resilient materials such as the block 16 have a significant effect in reducing the audible noise produced by the pawl and ratchet mechanism because of the energy loss or sound deadening characteristics thereof. I also believe that the very fact of mounting the pawl directly upon a soft and resilient body may also contribute significantly to noise reduction because of the shock absorbing characteristics of this material.

In summary, my invention provides improvements on piezoelectric synchronous drive motors which result in a material economy in the use of the piezoelectric material, reduce the unpleasant effects of the noise produced by the ratchet and pawl and provide a factory adjustment by which the piezoelectric motor is protected against the effects of wide excursions in the applied line voltage and is compelled to operate in strict synchronism with the line frequency even though the voltage may be subject to very significant variations.

I claim:
1. An electric motor comprising;
   (a) support means,
   (b) driven means movably supported on said support means,
   (c) a drive system including;
      (aa) a piezoelectric device having a fixed part secured to said support means and a free part which is moved when said piezoelectric device is electrically stressed,
      (bb) a driver carried by said free part and positioned to drive said driven means when said free part is moved, and
      (cc) sound dampening means having a high mechanical resistance to vibration and a very low capacity to transmit vibration interposed between said driver and said free part.

2. An electric motor according to claim 1 wherein said drive system includes a rigid member having a first end carried by said free part and a second end extending remotely from said first end, said driver being carried by said second end.

3. An electric motor according to claim 2 wherein said sound dampening means is interposed between said driver and said second end of said rigid member.

4. An electric motor according to claim 1 wherein a pair of spaced apart adjustable stop members are carried by said support means and said drive system includes abutment means positioned between said stop members whereby adjustment of said stop members determines the extent of motion of said driver.

5. An electric motor according to claim 4 wherein said abutment means comprises a projecting portion of said sound dampening means.

6. An electric motor comprising;
   (a) support means,
   (b) driven means movably supported on said support means,
   (c) a drive system including;
      (aa) a piezoelectric device having a fixed part secured to said support means and a free part which is moved when said piezoelectric device is electrically stressed, (bb) a driver carried by said free part and positioned to drive said driven means when said free part is moved, (d) abutment means on said drive system, said abutment means moving in a path when said piezoelectric device is energized, and (e) a pair of adjustable stops carried by said support means and projecting into the path of motion of said abutment means whereby adjustment of said stops determines the limits of motion of said driver.

7. An electric motor according to claim 6 wherein said abutment means has first and second contacting surfaces adapted to respectively contact third and fourth contacting surfaces on said stop members, said first and third contacting surfaces comprising a first pair and said second and fourth contacting surfaces comprising a second pair, at least one contacting surface in each of said pairs being formed of rubber-like material.

8. An electric motor according to claim 6 wherein said abutment means comprises a body of rubber-like material on which said driver is directly mounted, said body of rubber-like material being mounted on a rigid member which is attached to and projects from said piezoelectric device.

References Cited by the Examiner

UNITED STATES PATENTS

| 3,176,167 | 3/1965 | Vosseler | 310—8.6 |
| 3,204,133 | 8/1965 | Tschudin | 310—8.6 X |
| 3,225,226 | 12/1965 | Kawakami | 310—8.6 |

FOREIGN PATENTS

| 684,112 | 4/1964 | Canada. |
| 766,968 | 4/1934 | France. |
| 870,478 | 3/1942 | France. |

MILTON O. HIRSHFIELD, *Primary Examiner.*

A. J. ROSI, J. D. MILLER, *Assistant Examiners.*